United States Patent [19]

Inoue et al.

[11] Patent Number: 5,045,789
[45] Date of Patent: Sep. 3, 1991

[54] DETECTOR FOR DETECTING FOREIGN MATTER IN OBJECT BY USING DISCRIMINANT ELECTROMAGNETIC PARAMETERS

[75] Inventors: Shinichi Inoue, Kobe; Kazuo Nakayama, Akashi, both of Japan

[73] Assignee: Yamato Scale Company, Limited, Akashi, Japan

[21] Appl. No.: 385,681

[22] Filed: Jul. 26, 1989

Related U.S. Application Data

[63] Continuation-in-part of Ser. No. 336,213, Apr. 11, 1989.

[30] Foreign Application Priority Data

Jul. 26, 1988 [JP] Japan .................................. 63-185771

[51] Int. Cl.[5] ...................... G01N 27/72; G01R 33/12
[52] U.S. Cl. ..................................... 324/225; 324/226; 324/233; 324/243
[58] Field of Search ................ 324/225, 226, 233, 234, 324/239, 240, 241, 242, 243; 364/481, 482, 507, 550, 581; 209/559, 562, 563, 564, 567, 570, 571

[56] References Cited

U.S. PATENT DOCUMENTS

| | | | |
|---|---|---|---|
| 4,325,027 | 4/1982 | Dykstra et al. | 324/329 |
| 4,576,286 | 3/1986 | Buckley et al. | 209/558 |
| 4,690,284 | 9/1987 | Buckley et al. | 209/590 |

FOREIGN PATENT DOCUMENTS 8803273  5/1988  PCT Int'l Appl. .................. 324/239

*Primary Examiner*—Walter E. Snow
*Attorney, Agent, or Firm*—Senniger, Powers, Leavitt & Roedel

[57] ABSTRACT

A foreign matter detector includes an oscillator for generating an oscillating signal, a phase shifter connected to the oscillator and adapted to provide a phase shifted oscillating signal, and an electromagnetic transducer. The transducer includes an excitation coil connected to the oscillator and two interconnected detection coils magnetically coupled to the excitation coil and adapted to produce a differential signal therebetween when an object is passed through the transducer. The detector also includes a first detector adapted to produce a first detected analog signal corresponding to the component of the differential signal in phase with the oscillating signal and a second detector adapted to produce a second detected analog signal corresponding to the component of the differential signal in phase with the phase shifted oscillating signal. The detector further includes an analog to digital converter connected to the first and second detectors adapted for converting the first and second analog detected signals into first and second series of digital values, respectively, and circuitry connected to the converter for selecting a representative value for the object from each of the first and second series of the digital values.

35 Claims, 9 Drawing Sheets

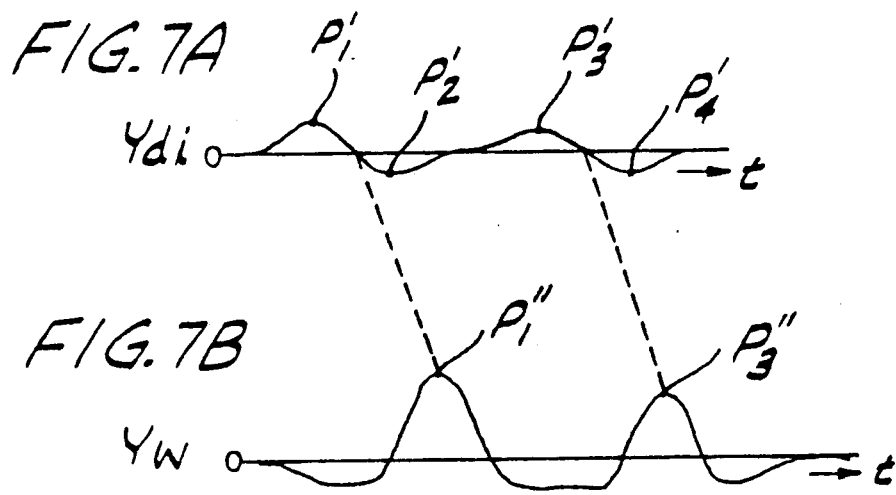
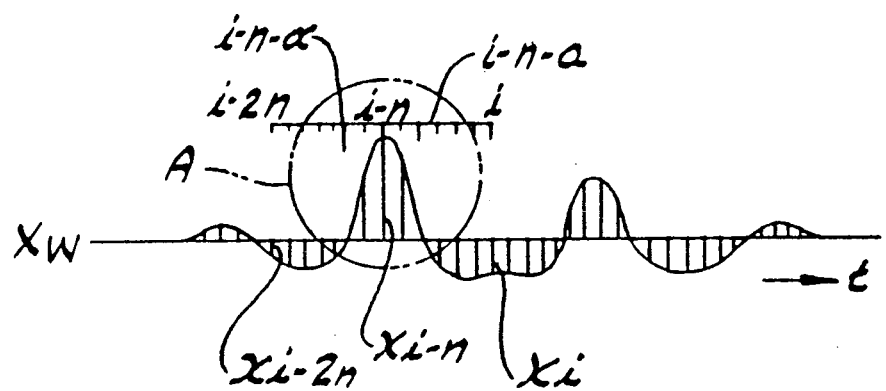
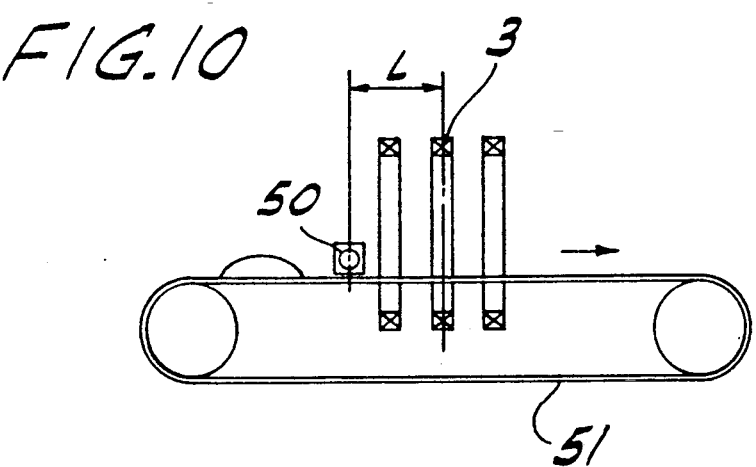

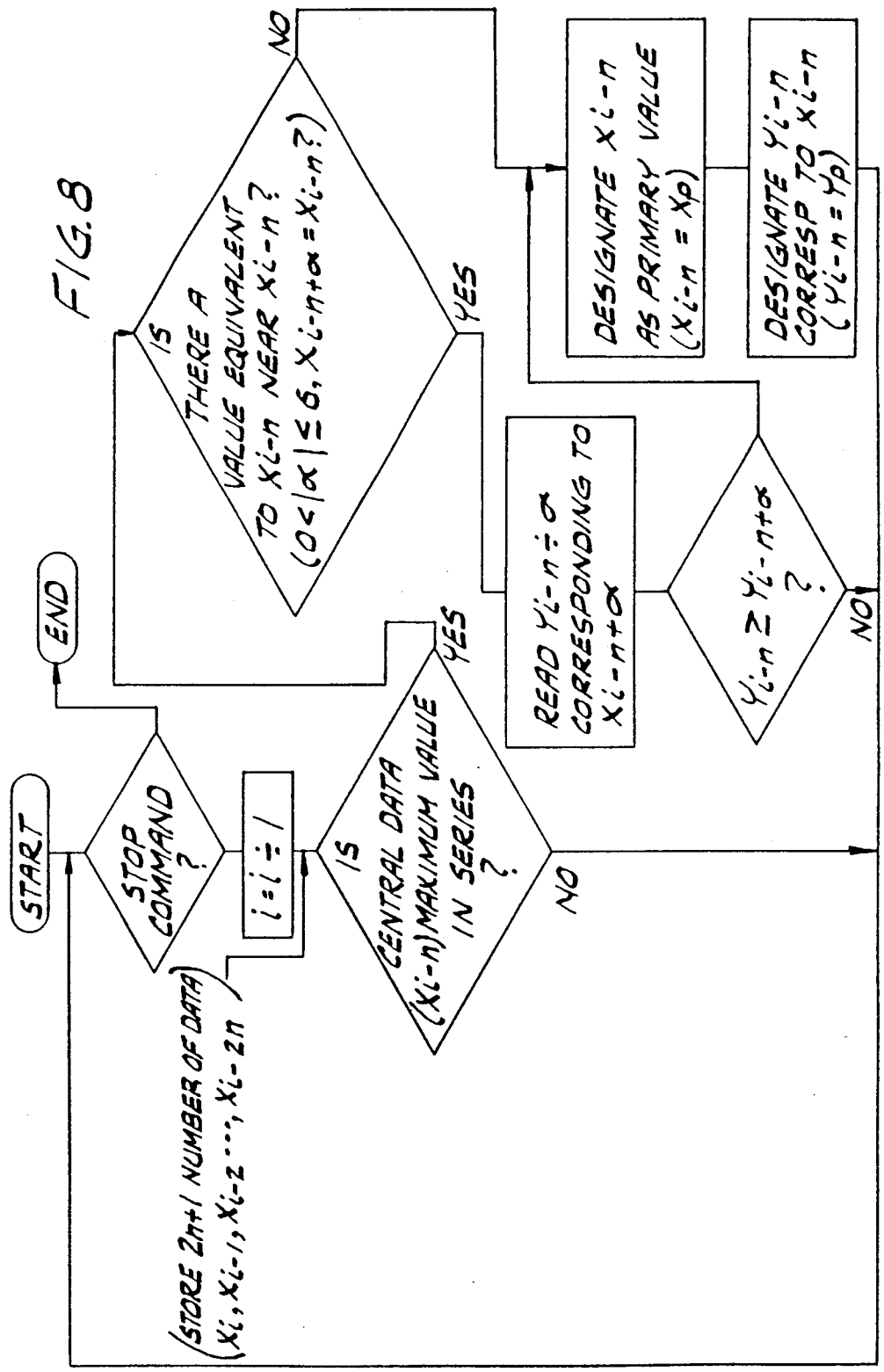

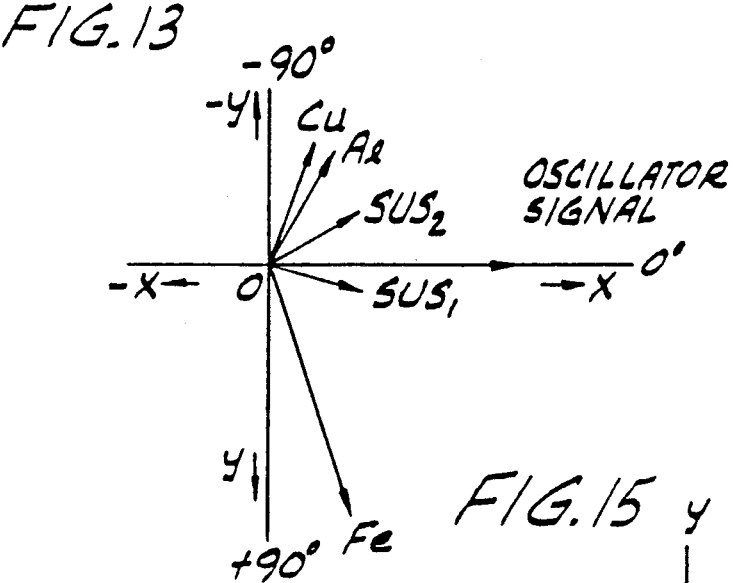
FIG. 13
FIG. 15
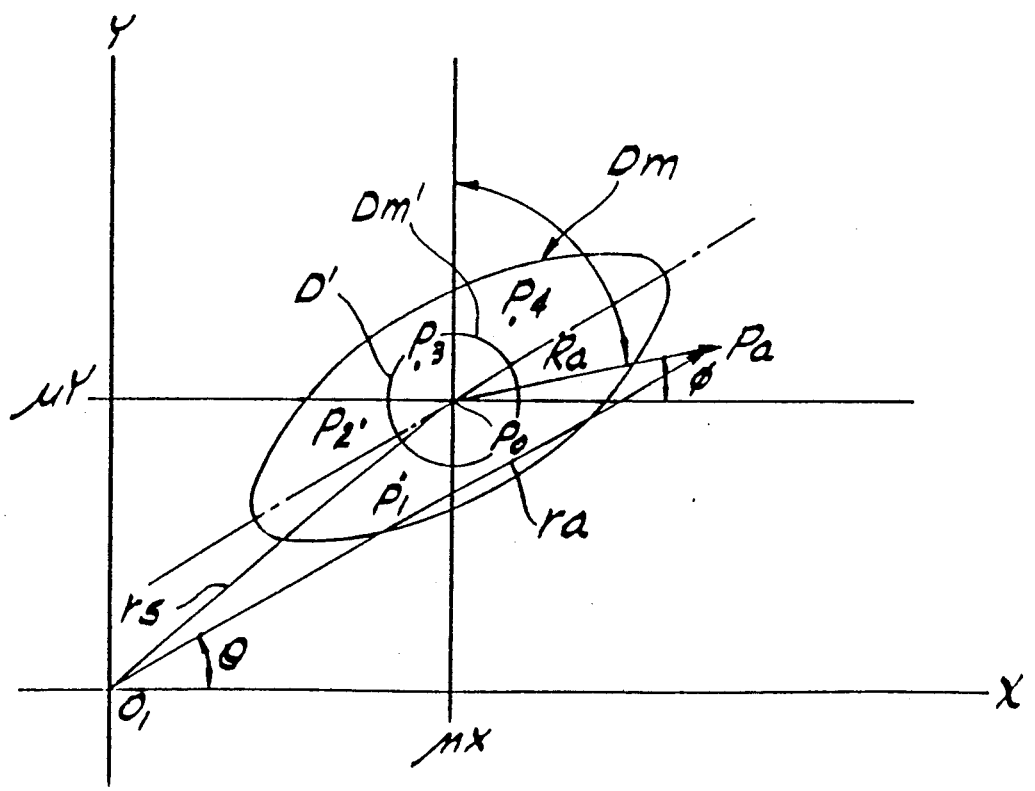
FIG. 14

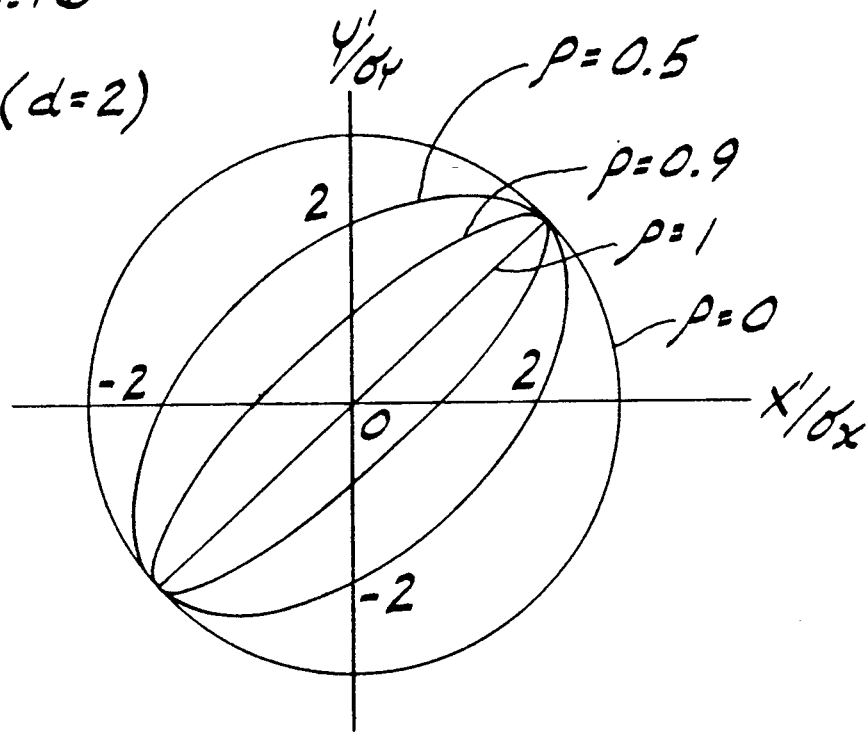
FIG.16 (d=2)
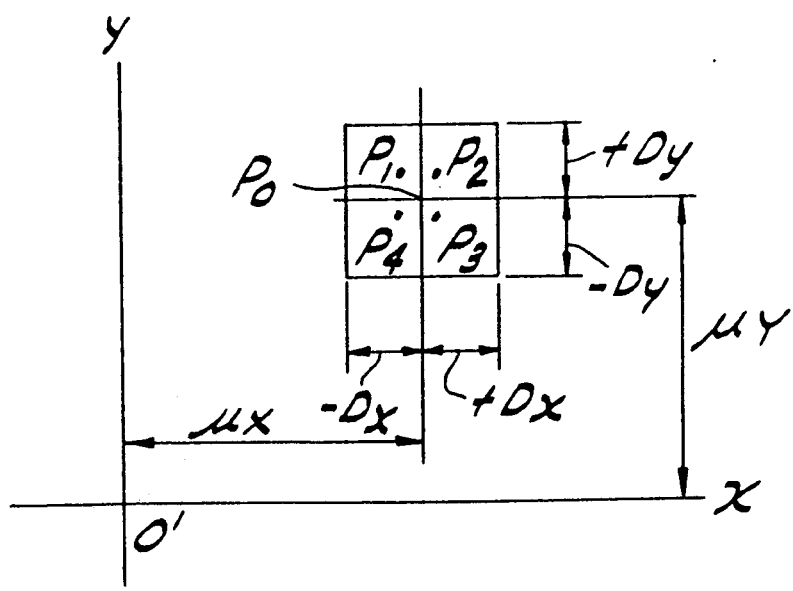
FIG.17

DETECTOR FOR DETECTING FOREIGN MATTER IN OBJECT BY USING DISCRIMINANT ELECTROMAGNETIC PARAMETERS

CROSS REFERENCE TO RELATED APPLICATION

This application is a continuation-in-part of copending application Ser. No. 336,213, filed Apr. 11, 1989.

BACKGROUND OF THE INVENTION

This invention relates to a detector for detecting intermediate products in raw materials or in wrapped finished products of food products or for detecting the presence of materials such as metals and other foreign matter in pharmaceutical products. This invention also relates to a detector for detecting in products a different quality from the inherent or standard quality of the actual product.

For manufacturers, such as food product manufacturers and pharmaceutical manufacturers, the presence of foreign matter in raw materials could cause damage to processing equipment. Also, the presence of foreign matter in finished products poses problems with regard to health and safety of the products. For this reason, detectors have long been used for inspections at the point at which raw materials for food products or pharmaceutical products are supplied to processing equipment and for inspection at the shipping point of wrapped finished products in order to determine whether or not foreign matter was present in the products.

As shown in FIGS. 19 and 20, this type of prior art detector is provided with a primary coil 3 which generates an alternating magnetic field when a high-frequency electrical current is supplied. Two secondary coils 4 and 5 are positioned inside this electromagnetic field. These coils 4 and 5 are wound in opposite directions from each other and are interconnected in series. In FIG. 19, the primary coil 3 is wound between and coaxially with the secondary coils 4 and 5. In FIG. 20, the primary coil 3 is wound in a plane parallel to the secondary coils 4 and 5. The detector utilizes the following phenomena which occur when the object being inspected is passed through the primary coil 3 and the two secondary coils 4 and 5 as indicated by arrow 31. If iron is contained in the object being inspected, the magnetic flux density will increase. The induced voltage of the secondary coil 4, which is closer to the point which the object is passing, will become higher than the induced voltage of the other secondary coil 5. Also, if a nonferrous metal is contained in the object, the eddy current occurring inside the nonferrous metal will cause a loss of the lines of magnetic force. As a result, the induced voltage of the secondary coil 4 will become lower than the induced voltage of the secondary coil 5.

Some food products may contain water or salt which may generate a relatively large signal even though they do not contain foreign matter. This signal represents the product characteristics of the material. If ferrous or nonferrous foreign matter is contained in these materials, the combination of the signal from this foreign matter and the product characteristics described above result in a composite signal. However, because the signal resulting from the foreign matter will be small if the foreign matter is small, there is little difference between the signal generated by the product characteristics of the product itself and the combination of this signal and that caused by the foreign matter. This makes it difficult to detect the foreign matter.

It is in consideration of problems such as this that detectors such as that described in Japanese Patent Provisional Publication Sho. 57-198880 have been proposed. In that detector, the oscillation signal from an oscillator is amplified via a phase adjuster to excite the primary coil. The difference in the induction voltages generated at the two secondary coils when the product passes through is used as the detection signal. This signal is first amplified and then split into two output signals. One of these output signals is detected using a chopper which is synchronized with the aforementioned oscillation signal to obtain an in-phase output signal. In addition, the other of these output signals is detected by a chopper which is provided with a phase difference of 90° with respect to the aforementioned oscillation signal to obtain a quadrature output signal. In this method, each of the obtained output signals passes through its own filter and is independently compared by a level comparator. Particularly for a product having a material effect, this type of detector is adjusted by the phase adjuster to the phase angle at which the material effect is minimum (to which the signal of the material effect is 90 degrees). The phase adjustment is done in a trial and error method, which requires skill of the operator. It is therefore difficult for the skilled operator to set the detector to an accurate phase. As a result, the detector may often be used with low accuracy. In addition, the detector cannot detect a foreign matter producing a signal in the reverse phase to the signal of a material effect (in the decreasing direction).

SUMMARY OF THE INVENTION

It is an object of this invention to provide a detector for detecting the presence of metals and other foreign matter which provides a detection signal which can be separately and clearly identified even when the signals are input continuously at relatively short intervals, and moreover, which provides detection signals containing quantitative information.

It is another object of this invention to provide a foreign matter detector which overcomes previously difficult problem of identifying each individual detected signal when the signals appear intermittently as double-wave detected signals by providing each signal as an easily identifiable waveform.

It is also an object of this invention to provide a foreign matter detector employing detection signals which can be converted from a double-wave signal having two polarities to a signal having a single maximum value.

It is another object of this invention to provide a foreign matter detector employing a detection signal which retains quantitative information needed in detecting and/or identifying foreign matter after signal processing and conversion.

It is another object of this invention to provide a foreign matter detector for accurate determination using pairs of data for one object.

In one form, the invention is a detector for detecting foreign matter in an object according to this invention. Means provides first and second detected signals representative of an electromagnetic parameter of the object. Means connected to the providing means converts the detected signals into first and second series of digital values, respectively. Means connected to the converting means determines a representative value for the object from each said series of digital values. Means connected to the determining means compares the representative value with a set of reference values.

It is a further object of this invention to provide a foreign matter detector wherein accurate reference values can be easily set. To this end, the detector includes means for automatically computing reference values with sample test results.

Other objects and features will be in part apparent and in part pointed out hereinafter.

BRIEF DESCRIPTION OF THE DRAWINGS

FIG. 7a shows a signal output from one of the smoothers/filters in the detector when two objects are passed in succession through the transducer;

FIG. 7b shows a weighted signal obtained by weighting the signal of FIG. 7a;

FIG. 8 is a flowchart of a program for determining a primary (maximum) value;

FIG. 9 shows monitoring of weighted digital values to obtain a primary value;

FIG. 10 is a partial schematic view of a modified detector according to the invention;

FIG. 13 is a two-axis coordinate system showing vectors which represent the detected values and types of metal;

FIG. 14 shows a graph representing sample test data for objects having material effect;

FIG. 15 shows a graph representing sample test data for objects having no material effect;

FIG. 16 shows a graph of the relationship between the correlation coefficient and the region determined by a discriminant equation according to the invention;

FIG. 17 shows a graph of the region determined by another discriminant equation according to the invention;

Corresponding reference characters indicate corresponding parts throughout the several views of the drawings.

DETAILED DESCRIPTION OF PREFERRED EMBODIMENTS

Figure 1:
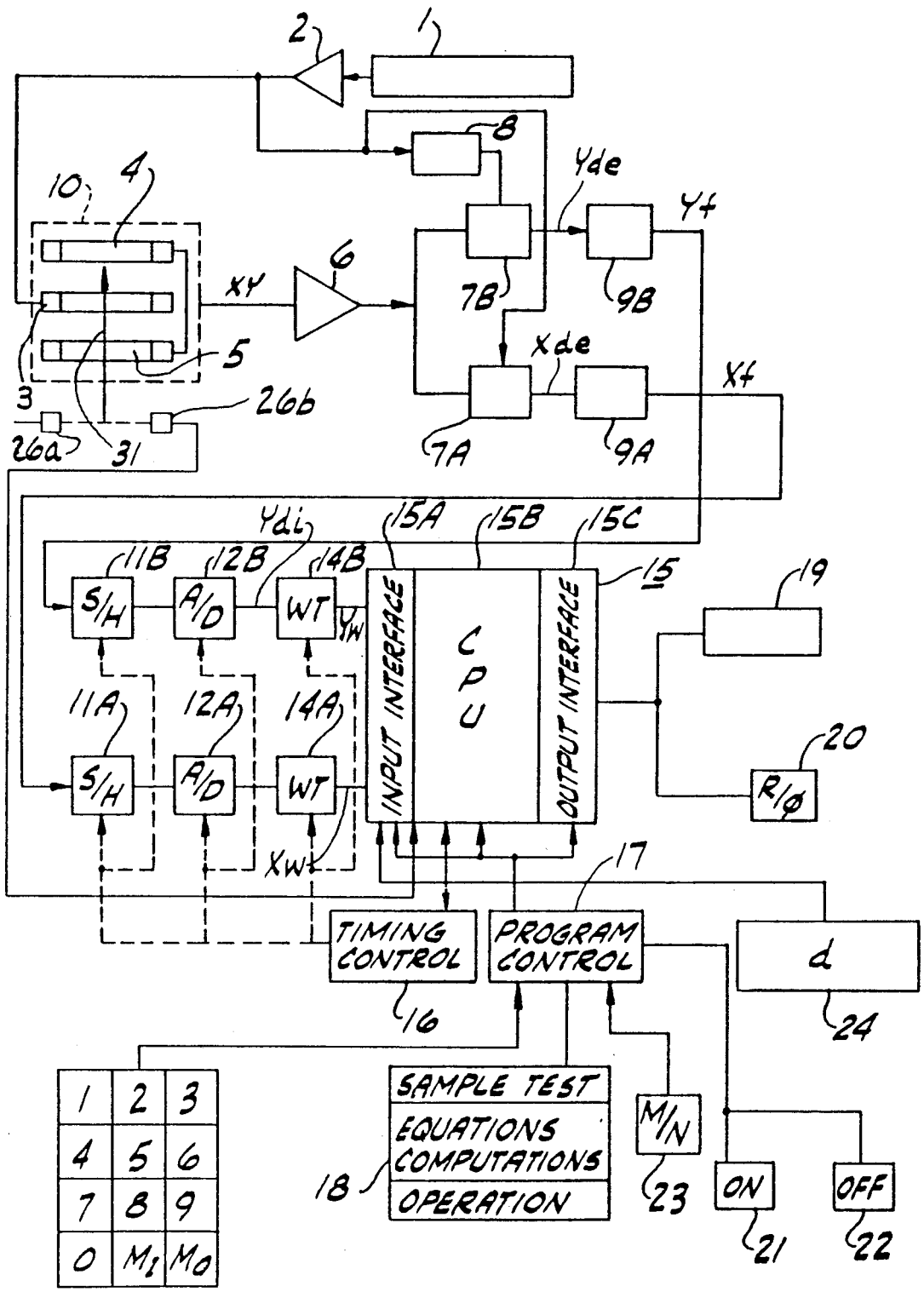
FIG. 1 is a block diagram of a detector according to the invention.
Figure 19:
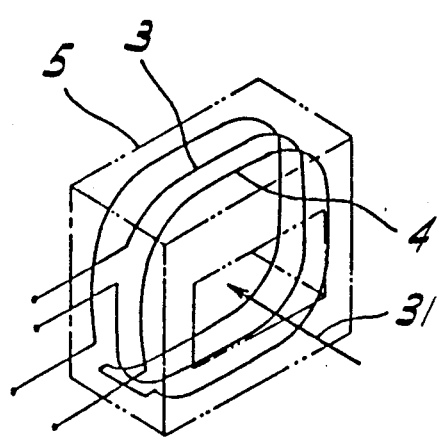
FIGS. 19 and 20 schematically show conventional, prior art electromagnetic transducers.
Figure 20:
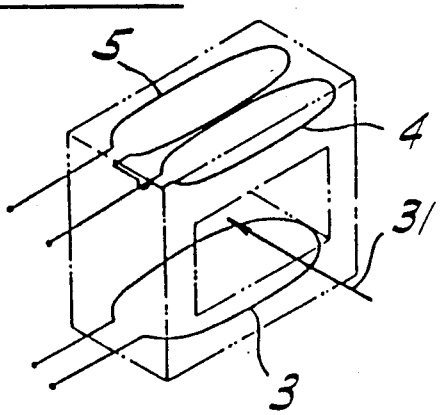

In FIG. 1, an oscillator 1 generates a sine-wave electrical alternating current signal having a frequency which is selectable within a range of 30 to 400 kHz (high-frequency current). An electromagnetic transducer 10 is essentially the same as the detector shown in FIG. 19, and may otherwise be constructed as the detector shown in FIG. 20. An amplifier 2 amplifies the sine-wave signal from the oscillator 1 and then supplies it to the primary or excitation coil 3 of the transducer 10. The coil 3 generates an alternating electromagnetic field. The two secondary or detection coils 4 and 5 of the transducer are arranged in close proximity to this primary coil 3, one on each side, within and coupled to the alternating electromagnetic field so that they are coaxial with the primary coil 3 as shown in FIG. 19. Coils 4 and 5 constitute means for providing a detected signal representative of an electromagnetic parameter of the object being evaluated. By connecting these secondary coils 4 and 5 so that they operate differentially (so that the induced voltages or induced currents cancel each other out), a detection means for detecting the difference in the induced signals which occur at these two secondary coils is formed.

A photoelectric sensor, which includes a light emitter 26A and a light receiver 26B, is located in front of the secondary coil 5 to detect the passage of the object into the transducer 10.

The output line from the secondary coils 4 and 5 is connected to a second amplifier 6. The output side of this amplifier 6 is subsequently divided and connected to the input side of multiplier/detectors 7A and 7B. These multiplier/detectors 7A and 7B are essentially the same as the four-quadrant detectors or product detectors which are used in FM receivers.

One of the signals which is divided after the amplifier 2 is input in the same phase to the multiplier/detector 7A for use as a reference signal. The divided signal is further divided and phase-delayed 90° by a phase shifter 8 for input to the other multiplication detector 7B as a reference signal.

The respective output sides of the multiplier/detectors 7A and 7B are connected via smoother and filter 9A or smoother and filter 9B to the input sides of sample-and-hold circuits 11A and 11B, which temporarily store the signals in memory. The output sides of these sample-and-hold circuits 11A and 11B are connected to A/D converters 12A and 12B, respectively, which convert the analog signals into digital signals. The output sides of these A/D converters 12A and 12B are connected via weighting circuits 14A and 14B, respectively, to a control device (computing device) 15, which constitutes means for recognizing a primary value of the digital signals and for identifying foreign matter and material effect of the object. Control device 15 is equipped with an input interface 15A for inputting the aforementioned signals, a central processing unit (CPU) 15B, such as a microprocessor, which processes the input signals, and an output interface 15C for outputting the results of the processing.

Control device 15 is connected to a timing control circuit 16 and a program control circuit 17. In order to control the timing, timing control circuit 16 is connected to the A/D converters 12A and 12B, the sample-and-hold circuits 11A and 11B, and the weighting circuits 14A and 14B. The program control circuit 17 is connected to a selector switch 18 for selecting the mode of operation from three settings: "sample test", "equations computation", and "operation".

The output interface 15C of the control device 15 is connected to an alarm 19 such as a lamp or buzzer which emits a warning indication when foreign matter is detected and to an R/φ indicator 20 which indicates the magnitude of the data and the phase angle. The data and phase angle represent the magnetic characteristics (parameters) or the type of material effect of the object, i.e., the type of foreign matter (metal, iron or non-ferrous metal, etc.) which has been detected in the object. Furthermore, the program control circuit 17 is connected to an execution button 21 which initiates operation of the control device 15, and to a stop button 22 which terminates operation of the control device 15.

The program control circuit 17 is also connected to a sample mode selector switch 23 for switching the sample mode between "M" and "N" modes. A region coefficient setting device 24 for specifying the region of the coefficients of the discriminant equation is connected to the input interface 15A of the control device 15. Additionally, the light receiver 26B is connected to the input interface 15A of the control device 15.

A keyboard 25 is connected to the program control circuit 17 for entering data. The keyboard 25 has numeric keys for specifying a code number, a command key $M_I$ for storing data in the memory of the CPU 15B, and a command key $M_o$ for recalling stored data.

Although the details will be explained later, the weighting circuits 14A and 14B are each shown in FIG. 2. In this embodiment weighting circuits 14A and 14B comprise n−1 stages of delay components 141, which are selected as appropriate in accordance with the sample time interval T and connected in cascade from the input sides to the output sides. The line to the input to each delay component 141 is divided. One branch of the division is connected to the next delay component. The other branch of the division and the output side of the last delay component is connected to the corresponding coefficient multipliers $142_o$ to $142_{n-1}$. Each of the output sides of the various coefficient multipliers $142_o$ to $142_{n-1}$ is connected to a summer such as counter 143. By using digital computing, it is also possible for the weighting circuit to be comprised of a microcomputer having functions equivalent to the weighting circuit embodiment illustrated in FIG. 2.

As will be explained later, the method used by the weighting circuits 14A and 14B to assign the coefficients to the coefficient multipliers $142_o$ to $142_{n-1}$ is an odd-function distribution. An odd function distribution is a function which is symmetrical with respect to the origin. For example, $Y = \sin \theta$ where $-\pi < \theta < \pi$ is an odd function. The origin is the intersection of the X and Y planes of an X-Y coordinate system. In other words, each weighting circuit has a coefficient distribution in which the coefficients are assigned to the coefficient multipliers in such a manner that the origination point of the odd function is located at or near the center coefficient multiplier of the coefficient multipliers $142_o$ to $142_{n-1}$ arranged in order, or with a similar coefficient distribution.

In one preferred embodiment, the weighting coefficients have a distribution corresponding to the changes in time of the detected signal when a typical material such as iron passes through the primary and secondary coils. For example, the distribution of coefficients may be a waveform formed of an upward triangle and a downward triangle similar to that shown in FIG. 5a, or a one cycle sine-wave like that shown in FIG. 5b, or a waveform with a distribution comprised of two squares like that shown in FIG. 5c, or a distribution configuration similar to these waveforms. The weighting coefficients for each waveform are assigned in advance to the two weighting circuits 14A and 14B.

Signal Detection and Processing (Weighting Processing)

The following is an explanation of the contents of the program stored in the memory of the control device 15. An explanation of the execution of the program and of the operations of the various components mentioned above as the program is executed is also described.

When an object containing iron is passed through (or adjacent) the primary coil 3 and the secondary coils 4 and 5 for inspection the electromagnetic induction formed between the primary coil 3 and the secondary coils 4 and 5 changes as the object being inspected passes. An induced voltage (detection signal XY) with a shape such as that shown in FIG. 3a is generated as the differential output of the secondary coils 4 and 5.

This detection signal XY is amplified by the amplifier 6, and then input to the multiplier/detectors 7A and 7B. The detection signal which is input to the multiplier/detector 7A is detected by multiplication by a reference signal having a phase which is the same the phase of the signal produced by oscillator 1. That signal detected by detector 7A (referred to as in-phase detected signal Xde) has a waveform such as that shown in FIG. 3b. Meanwhile, the detection signal XY input to the multiplier/detector 7B is detected by multiplication by a reference signal having a phase which is shifted 90° from the phase of the signal produced by oscillator 1. The signal detected by detector 7B (referred to as phase shifted detected signal Yde) has a waveform such as that shown in FIG. 3b.

Figure 3C:
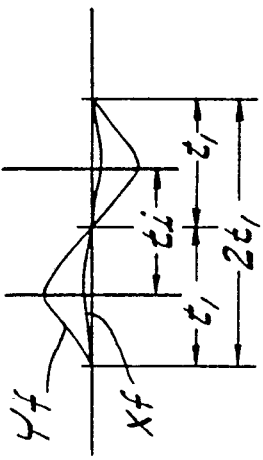
FIGS. 3a-3c show analog signals at various stages in the detector.

The detected signals Xde and Yde are processed by corresponding smoothers/filters 9A and 9B so that they become filtered signals Xf and Yf with waveforms such as those shown in FIG. 3c. Filtered signal Xf corresponds to the signal component of the differential signal which is in-phase with the signal of oscillator 1, and filtered signal Yf corresponds to the signal component of the differential signal which has a 90° phase delay from the signal of the oscillator 1.

The filtered signals are temporarily stored in memory by the corresponding sample-and-hold circuits 11A and 11B. Each of the stored signals (which are analog signals) is converted to digital signals Xdi and Ydi by the corresponding A/D converters 12A and 12B, respectively.

The sample-and-hold circuits 11A and 11B and the A/D converters 12A and 12B are all operated in synchronization by the timing control circuit 16. The analog signals are converted into digital signals at regular intervals and then input to the corresponding weighting circuits 14A and 14B. At the weighting circuits 14A and 14B, as mentioned earlier and as will be explained in detail below, weighting computation (processing) characterized by a time distribution is performed and the processed output signals Xw and Yw are provided to the input interface 15A of the control device 15.

Figure 4:
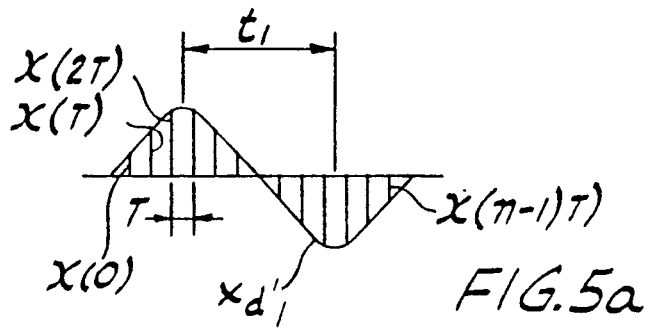
FIG. 4 shows a digital signal from one of the A/D converters in the detector.

Referring to the example illustrated in FIG. 4, when the processed output signal Xw is input to the weighting circuit 14A, it is a discrete series of signals X(0), X(T), X(2T), ... X((n−1)T) at sample time intervals T. (For convenience, this explanation uses zero as the time of the first signal.)

Each of weighting circuits 14A and 14B has a transfer function which is a series which can be expressed as a polynomial relating to $Z^{-1}$ to the order n−1, as shown in the following Equation (1).

$$H_{(z)} = K_0 + K_1 Z^{-1} + K_2 Z^{-2} + \ldots K_{n-1} Z^{-(n-1)} \quad (1)$$

Figure 2:
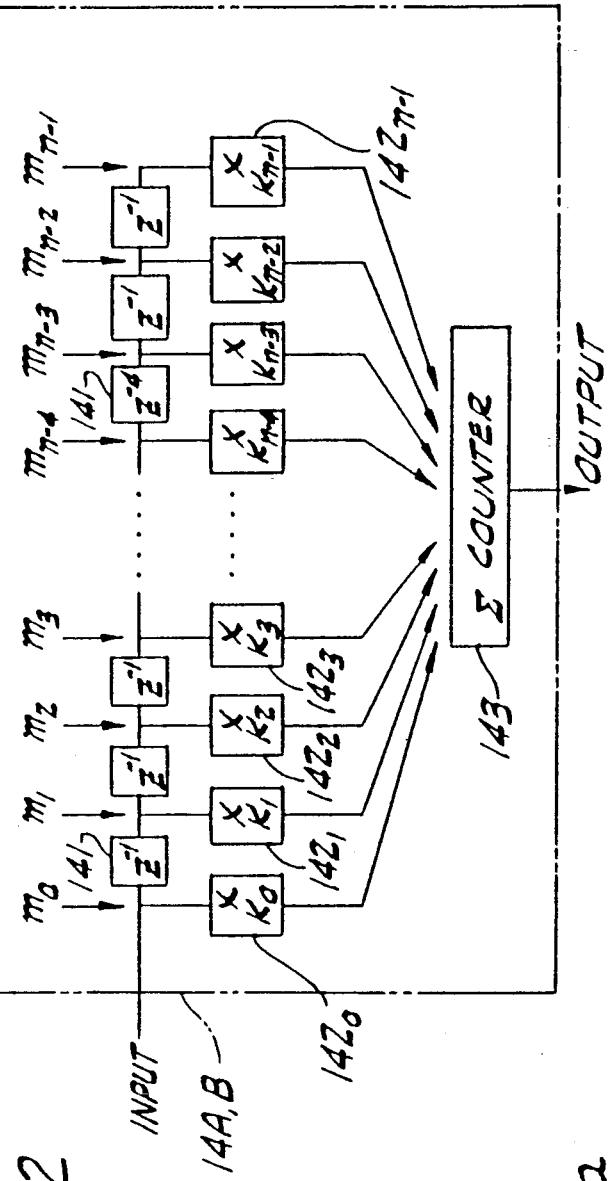
FIG. 2 is a block diagram of one form of weighting circuit for the detector.
Figure 5A:
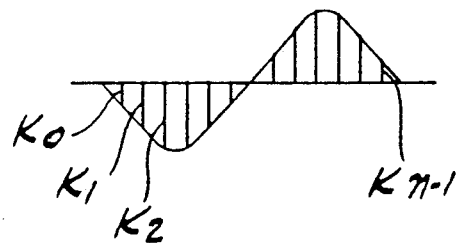
FIGS. 5a-5c are graphic representations of various weighting functions.

One preferred embodiment of weighting circuits 4A and 14B is shown in FIG. 2. Coefficients $K_0$, $K_1$, $K_2$ ... $K_{n-1}$ correspond to a sampling of the waveform illustrated in FIG. 5a, which resembles the changes over time of the signal detected when a typical material such as iron is passed through the primary and secondary coils. A typical waveform for iron is shown in FIG. 4. The sampling interval for the coefficients $K_0$, $K_1$, $K_2$, etc., which are shown in FIG. 5a is the same as the sample time interval T (see FIG. 4). When an input signal with a waveform such as that shown in FIG. 4 is input to a circuit having the transfer function of Equation (1) with its coefficients determined in the way hereunder described, or to a circuit for which the coefficients are determined so as to make the circuit equivalent to the circuit with the composition shown in FIG. 2, a time series of data (output signals) such as that shown in FIG. 6 is obtained.

Figure 5B:
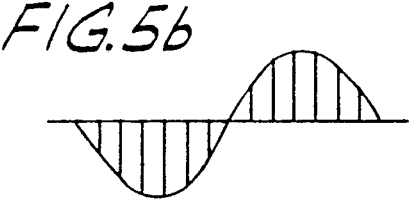
Figure 5C:
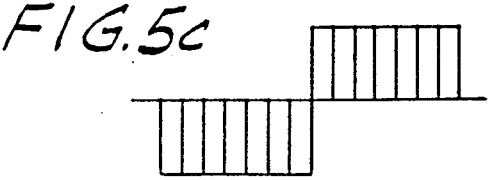

For the weighting coefficients described above, it is possible to use a configuration having a distribution comprised of an upward triangle and a downward triangle similar to that shown in FIG. 5a, or a one cycle sine waveform like that shown in FIG. 5b, or a configuration having a distribution comprised of two rectangles like that shown in FIG. 5c, or a configuration similar to any of these waveforms. In other words, any configuration is acceptable as long as the distribution of the weighting coefficients has a limited width with respect to time. This width corresponds to the order (the order $n-1$ mentioned above) of the transfer function described above and it has a odd-function distribution wherein the part located at the center of that order is the origin point.

Figure 6:
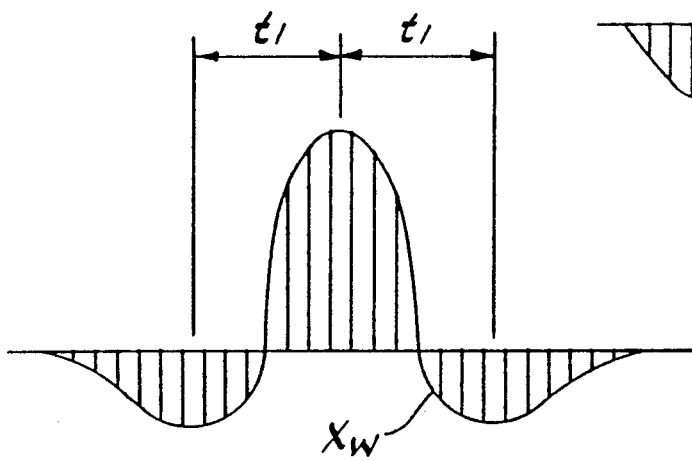
FIG. 6 shows a weighted digital signal from one of the weighting circuits in the detector.

As explained above, with the weighting coefficient configuration just described and an input signal such as that shown in FIG. 4, it is possible to obtain an output Xw having substantially the same distribution configuration as that shown in FIG. 6. The Yw signal can also be obtained for the Y signal by processing in the same way as described above for the X signal.

No matter which of the above configurations of weighting processing (FIGS. 5a–5c) is used, an input signal with the polarities shown in FIG. 4 will produce the output signal shown in FIG. 6 having configurational characteristics which make a series of changes over time which resemble: 0→negative output→minimum value→increase→0→increase→maximum value→decrease→0→decrease→minimum value→increase→0.

The output signal shown in FIG. 6 has the following characteristics: (1) the amplitude of the maximum value is about twice that of the minimum value; (2) the polarity of the minimum value is the opposite of that of the maximum value; this minimum value appears twice at approximately an interval $t_1$ preceding and following the maximum value; and (3) the data of the output signal which precedes and follows the central maximum value is symmetrical or approximately symmetrical around that maximum value.

Conversely, if the polarities of the input signal are the reverse of those shown in FIG. 4, an output signal Xw or Yw having the exact opposite polarities from those described above is obtained.

In other words, the output signal from the weighting means, to which an input signal such as shown in FIG. 4 is applied, has the characteristics of a discrete time-series output signal, which is distributed to be an even function with the origin point having the maximum value, if the time at which the time-series weighted signal has the maximum value is defined as the origin point of time.

Recognition of the Primary Value by the Central Processing Unit

The "primary value" is the representative value for the electromagnetic characteristics of an object being inspected. The central processing unit (CPU) 15B has a program, as shown by the flowchart of FIG. 8, for the recognition of the primary values of the Xw and Yw signals output from the weighting circuits 14A and 14B.

FIG. 9 is a representation of a detected and weighted Xw signal across a specified time span.

In order to recognize the primary value, it is necessary to monitor the representative changes according to the time of the Xw signal with a waveform such as that shown in FIG. 6. The monitoring span should be three to five times the time interval $t_1$ of the two peaks which occur when foreign matter generates a detection signal such as that shown in FIG. 4 is passed through the coils. An appropriate $2n+1$ number of Xw (or Yw) data signals obtained during that time span are constantly monitored.

For example, as shown in the following Table 1, the Xw signals are monitored in order from the newest data to the oldest data and stored in a series of memory addresses.

TABLE 1

| Address | 0 | 1 | 2 | 3 | ... | n | ... | 2n |
|---|---|---|---|---|---|---|---|---|
| Data | $X_i$ | $X_{i-1}$ | $X_{i-2}$ | $X_{i-3}$ | ... | $X_{i-n}$ | ... | $X_{i-2n}$ |

The central data address in this case is n and the data $X_{i-n}$ is stored at that address at that time. When new data is input, the previous data shift in order from the left to the right. The new data is then input to address 0 and the oldest data is discarded. Also, the data at the central address n is monitored and when the absolute value of that data is the only maximum value among the $2n+1$ number of data items at that time, that data $X_{i-n}$ is recognized as the primary value.

When the data $X_{i-n}$ indicating the maximum value is at a position such as that indicated by the circle A in FIG. 9 and a comparison indicates that there is an identical value $X_{i-n+\alpha}$ in the circle A, the following equation (2) is used to check whether or not the identical value is in the specific vicinity of the central address.

$$0 < |\alpha| \leq \delta, \ X_{i-n+\alpha} = X_{i-n}? \quad (2)$$

Provided that $\delta$ is a value which determines the limit of the vicinity of the central address.

Then, if it is determined that the identical value is in the vicinity of the central address, the Y signal values $Y_{i-n}$ and $Y_{i-n+\alpha}$ which correspond to positions of the $X_{i-n}$ and $X_{i-n+\alpha}$ data are compared, and if $Y_{i-n} \geq Y_{i-n+\alpha}$, $X_{i-n}$ is determined to be the primary value $X_p$.

Also, the corresponding $Y_{i-n}$ value is determined to be the primary value for the Y signal. Conversely, if the $Y_{i-n+\alpha}$ value is found to be larger than the $Y_{i-n}$ value, $X_{i-n}$ is not determined to be the primary value. If this occurs, because the $Y_{i-n+\alpha}$ data is subsequently shifted to the central address $\alpha$ times the sampling interval later, that value becomes the maximum value and is thus determined to be the primary value $Y_p$.

Each time new data is added at the specified time intervals, each of the positions (addresses) are shifted one place and the oldest data $Y_{i-2n}$ is discarded.

If the objects are limited to solid objects or individual batches such as packaged products, because the signals are originally detected individually, the primary values can be obtained without weighting. For example, as shown in FIG. 10, a positionally adjustable photoelectric or other type of sensor 50 (having an operating time different from that of sensor 26A, 26B in FIG. 1) is provided at an appropriate interval L lengthwise along a belt conveyor 51 with respect to the center of primary coil 3.

Figure 12A:
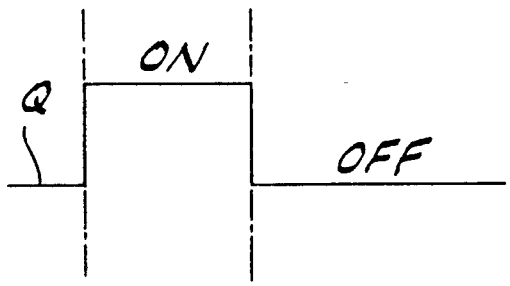
FIG. 12a and 12b show signals at different points in the modified detector of FIG. 10.
Figure 12B:
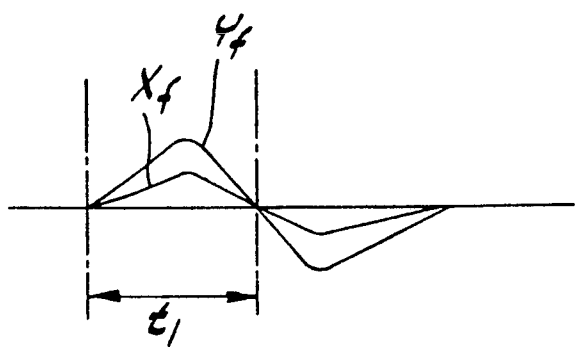

As shown in FIGS. 12a and 12b, the position and operating time of sensor 50 are preadjusted so that a passage signal Q generated by the sensor 50 is ON for a time t1 which corresponds to the first half of the undulating waveform of filtered signals Xf and Yf generated when the object is passed through the coils by the conveyor 51. The passage signal Q is OFF when the filtered signals Xf and Yf reach the zero point.

Figure 11:
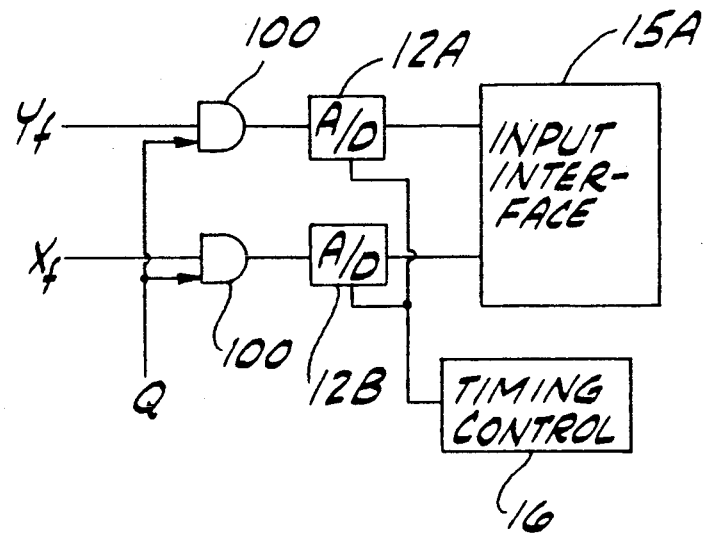
FIG. 11 is a block diagram of circuitry used with the detector of FIG. 10.

The signals Xf and Yf and the passage signal Q are input to AND circuits 100 as shown in FIG. 11. The signals Xf and Yf are detected only when the signal Q is ON (i.e., only the first halves of signals Xf and Yf are detected). Subsequently, the output signals of AND circuits 100 are converted to digital signals by A/D converters 12A and 12B. These digital signals are provided to the input interface 15A. The primary values can be obtained from the digital signals in the same way as for the weighted signals. By obtaining the primary values in this way, although there are drawbacks such as the limitation of which objects can be packaged and the need to adjust the position of the sensor 50, the determination of primary values is simpler due to elimination of the weighting step.

FIG. 13 shows reactors which represent the primary values Xp and Yp for various materials. The phase angle of the detection signal for iron is generally delayed approximately 90 from that of the oscillation signal and the output sensitivity is high. In contrast, the phase difference of the detection signal for stainless steel with respect to the oscillation signal is not very large.

Figure 3B:
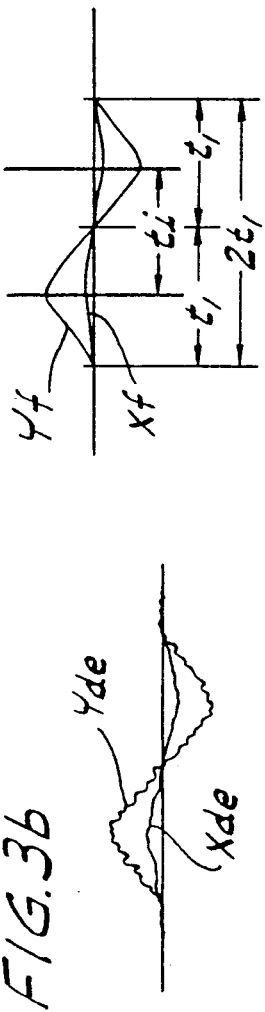
Figure 3A:
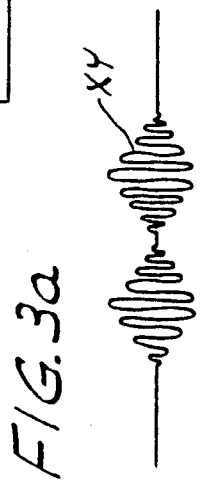

Now, using iron, for example, the component of the detection signal which is in-phase with the oscillation signal is indicated as X and the component which has a phase delay of 90 from the oscillation signal is indicated as Y. If both components are considered to be positive values, as shown in FIGS. 3b and 3c, the Y component of the detection signal for iron is larger than the X component. For some types of stainless steel (indicated as "SUS$_1$" in FIG. 13), the X component and the Y component are both positive values. For other types of stainless steel (indicated as SUS$_2$ in FIG. 13), the X component is a positive value and the Y component is a negative value. Among the various types of materials for detected matter, some generate lagging signals like that of iron, and others generate leading signals.

Identification by the CPU (Judgement Section)

The central processing unit 15 includes a program for identification. The following is an explanation of one preferred embodiment for the identification formed by the program.

In the following explanation, the effects of product characteristics on the detector when measuring a material which has marked product characteristics are referred to as the material effect.

Products can be generally classified into those which have product characteristics corresponding to the detector and those which do not. The material effect generally has characteristics peculiar to each individual product and a phase angle peculiar to each product. Although the size of the vector will change with the content volume of the product, the phase angle will usually not change very much.

Correlation

For more precise region determination, consideration is given to the correlation of representative values X and Y. Specifically, a correlation coefficient $\rho$, as a factor representing the correlation of values X and Y, is included in a discriminant equation, which determines the region and will be explained later. The relationship between this correlation coefficient $\rho$ and the region is as follows:

Supposing $X' = X - \mu X$ and $Y' = Y - \mu Y$. in order to find a general expression, $\sigma x$ and $\sigma y$ are selected for the unit measures of X and Y, and $X'/\sigma x$ and $y'/\sigma y$ are used for the axes of the coordinate system in order to normalize it. The relationship between the coefficient $\rho$ and the region can be expressed as shown in FIG. 16.

In FIG. 16, the shape or area of the region changes with the correlation coefficient. Specifically, if there is no correlation (if $\rho = 0$) between the representative values X and Y, the region is a circle, with widest possible width. Also, the stronger the correlation, the larger the difference between the major and minor axes, and the more elliptic the region. The region becomes narrower as the correlation coefficient approaches "1".

If the material effect is small, because the weighted signals Xw and Yw have the characteristics of noise, the sizes and phase of the signals are random and mutually unrelated, as shown in FIG. 15 and explained earlier. When the two-dimensional pairs of representative values X and Y extracted at random from weighted values Xw and Yw, respectively, are plotted on the coordinate system, they are distributed in an approximately circular region. In other words, in this case, the correlation coefficient $\rho$ is a value approaching zero. Each of the signals Xw and Yw has two dimensions which are phase and amplitude.

On the other hand, if the material effect is large and the objects are either lumps or have fluctuations in their content volume, although the representative values X and Y which are primary values Xp and Yp will sometimes change momentarily, the ratio of them will maintain an approximately fixed relationship. In other words, because there is correlation between X and Y, the plotting of the pairs of these values on a coordinate system is generally distributed in an elliptical shape as shown in FIG. 14.

Thus, as will be explained later, the discriminant equation which determines the region can be established as a discriminant equation for an elliptical region which includes correlation. By including correlation in the equation, the region can be more narrowly defined than if correlation is not taken into consideration. Defective products which were mistakenly judged to be non-defective when correlation was previously not taken into consideration can be correctly judged to be defective. This results in more accurate judgments. The introduction of the concept of correlation improves the capacity to judge the presence of foreign matter.

FIG. 14 shows a two-axis four-quadrant plane on which the points $P_1(X_{p1}, Y_{p1})$, $P_2(X_{p2}, Y_{p2})$, etc., represent the primary values $X_p$ and $Y_p$ for various volumes of products of the same type which have material effect, but which contain no foreign matter. Even if products of the same type differ somewhat in volume or weight, these points will be included in an elliptic region Dm, and will tend to be distributed near the central average point $P_o(\mu X, \mu Y)$, which can be represented by a vector $r_s$ from the origin point $O_1$ of the graph.

The primary values for packages of products of the same type and substantially of the same volume and weight with material effect, but with no foreign matter, will be distributed within a small circular region Dm'.

The primary values for a product having material effect and containing even minute particles of metal or other foreign matter will be represented at a point $P_a$ $(X_a, Y_a)$ as a vector $r_a$ on the graph in FIG. 14. Subtraction of vector $r_s$ from vector $r_a$ gives a deviation vector $R_a$ from the average point $P_o$.

Thus, the region Dm defines the distribution boundary for products without foreign matter and data outside this region, such as vector $R_a$, are judged to represent products which contain foreign matter.

For products having neither material effect nor foreign matter almost no waveform characteristics as shown in FIG. 6 appear for the weighted signals. In this case, random noise resulting from internal electrical factors, such as the operation of the amplifier, the signal detector, or a conveyor, becomes the primary factor in determining the distribution region.

As shown in FIG. 15, these products are represented as points $P_1$, $P_2$, etc., within a circular region Dn on the graph. The central average point $P_o$ of region Dn is extremely close to the origin point. The region Dn is extremely smaller than for products having material effect.

In this case, the size of the deviation vector $R_a$ is approximately the same as that of the signal vector $r_a$. Because of the small size of region Dn, even if the absolute lengths or quantities of these vectors are relatively small, they will extend beyond region Dn. It is thus possible to detect even more minute particles of foreign matter than for products having material effect.

As mentioned earlier, the selector switch 18 is provided with a sample test mode. There is also a sample mode selector switch 23 which allows selection of either an "M" or "N" mode for the sample test, the characteristics of which are explained below.

M (material effect detection) mode sample test:

The test of a sample object which has material effect and which contains no foreign matter uses the primary values $X_p$ and $Y_p$ containing product characteristics. The signals obtained through this test are data which includes the product characteristics together with their occasional fluctuations, and also the effects of the various minute amounts of noise which remains even after filtering.

N (noise detection) mode sample test:

This test is done for sample objects which have no product characteristics and which contain no foreign matter. When a packaged object passes through the coils of the transducer 10 and detected by the sensor 26A-26B (FIG. 1), the passage signal is generated for a period of time which corresponds to the time $2t_1$ (FIG. 3c). Time $2t_1$ is the sum of time $t_1$ preceding the passage of the center of the coils by the inspection object and time $t_1$ following the passage of the center. While this passage signal is being generated, pairs of weighted values Xw and Yw are extracted as data $X_{sn}$ and $Y_{sn}$, respectively, at regular intervals of a certain number of samples from among the continuous weighted values. For example, 10 to 20 weighted values are extracted for one packaged object. These values $X_{sn}$ and $Y_{sn}$ are referred to as "N mode sample signals". These values Xsn and Ysn may be represented by points P1-P4 in FIG. 15. Generally, because various types of random noise are a major factor concerning the signals of products which do not generate product characteristics, the N mode sample signals Xsn and Ysn are also random with regard to a time series. It is possible to appropriately extract the characteristics of the amplitude, distribution, etc., of the original random signals from the many data signals obtained by extracting at certain intervals as described above.

The sample values Xsm and Xsn of the M and N modes are generally referred to as a sample value Xs hereinafter, and the values Ysm and Ysn are referred to as a sample value Ys.

The sample values Xs and primary values Xp are generally termed representative values X hereinafter, and Ys and Yp as representative values Y.

A sample test is performed by selecting either the M or N mode. In order to accomplish this, a memory is provided inside the CPU 15B for storing a number of sample data $X_{sm}$ and $Y_{sm}$ (M mode) or $X_{sn}$ and $Y_{sn}$ (N mode) obtained when the product sample passes through the coils. A program is provided to compute each of the following values using that sample data.

$\mu X$: average value of $X_s$
$\mu Y$: average value of $Y_s$
$\sigma_x$: standard deviation regarding $X_s$
$\sigma y$: standard deviation regarding $Y_s$
$\sigma_{xy}$: covariance regarding $X_s$ and $Y_s$
$\rho$: correlation coefficient expressed as $$\frac{\sigma xy}{\sigma x \cdot \sigma y}$$

Because the detailed explanations of the symbols listed above are contained in general reference works on statistics, they will be omitted here.

The primary values Xp and Yp are used to compute a discriminant equation or discriminant equations. Judgment concerning the presence of foreign matter is made on the basis of whether the equation is satisfied.

Discriminant Equation According to the First Embodiment

In the judgment processing, an equation such as the following Equation (3), which is one example of the statistical distribution functions found in reference works on statistics, is used as the density function of the statistical distribution of the data. This equation works both for inspection objects which have a material effect and for those which do not, as long as the data is considered to be from the same population.

$$f(x,y) = \frac{1}{2\pi \sqrt{1 - \rho^2} \sigma_x \sigma_y} \cdot \quad (3)$$

$$e^{-\frac{1}{2(1-\rho^2)}\left[\frac{(X-\mu X)^2}{\sigma_x^2}-2\rho\frac{(X-\mu X)(Y-\mu Y)}{\sigma_x\sigma_y}+\frac{(Y-\mu Y)^2}{\sigma_y^2}\right]}$$

In this embodiment, in order to determine the region condition, the part of the above Equation (3) concerning the exponent of the equation is referred to as "D". This D is a numerical value which determines the region, and it may be determined either based on empirical data, or by the following equation which uses correlation coefficient ρ and the region coefficient d which will be explained later.

$$D = \frac{2}{(1+\rho)} \cdot d^2$$

Thus, using the above discriminant equation, the following Equation (4) is the basic discriminant equation for determining the region.

$$\frac{1}{(1-\rho^2)} \cdot \frac{(X-\mu X)^2}{\sigma_x^2} - 2\rho\frac{(X-\mu X)(Y-\mu Y)}{(1-\rho^2)\sigma_x\sigma_y} + \frac{1}{(1-\rho^2)} \cdot \frac{(Y-\mu Y)^2}{\sigma_y^2} = \frac{2}{1+\rho}d^2 = D \quad (4)$$

The region coefficient "d" in the above Equation (4) is input by the region coefficient setting device 24 shown in FIG. 1, which is the input device for this embodiment.

The value d is essentially like a numerical coefficient of σ on statistics. For example, (i) For 2σ, d = 2, (5)

$$\therefore D = \frac{2}{1+\rho} \times d^2 = \frac{8}{1+\rho}$$

(ii) For 3σ, d = 3, (6)

$$\therefore D = \frac{2}{1+\rho} \times d^2 = \frac{18}{1+\rho}$$

This coefficient d can be appropriately selected by the operator in association with the confidence value. Thus, when the correlation coefficient ρ is calculated and the region coefficient d is selected by the operator, the value of "D", which determines the region, is determined.

In addition, by using the following definitions, $$A = \frac{1}{(1-\rho^2)\sigma_x^2}$$

$$B = \frac{-2\rho}{(1-\rho^2)\sigma_x \cdot \sigma_x}$$

$$C = \frac{1}{(1-\rho^2)\sigma_y^2}$$

Equation (4) can be rewritten as the following Equations (7) and (7)'.

$$A(X-\mu X)^2 + B(X-\mu X)(Y-\mu Y) + C(Y-\mu Y)^2 = D \quad (7)$$

$$A(X-\mu X)^2 + B(X-\mu X)(Y-\mu Y) + C(Y-\mu Y)^2 - D \leq 0 \quad (7)'$$

Equation (7) determines the boundary of the distribution region and Equation (7)' is the discriminant equation which judges whether or not the data is included in the region.

As explained earlier, because Equation (7) defines an elliptical or circular region, depending on the value of the correlation coefficient ρ, it is applicable to both products which have material effect and those which do not.

Equation (7)' is included in the CPU 15B in the form of a program, and computed for each pair of primary values Xp and Yp at final inspection of objects.

Theoretically, the region discriminant equation can be determined by the operator selecting and inputting appropriate values A, H and C, and the region coefficient d in accordance with the characteristics of the object. However, because it is not easy to select these values, provision has been made in this embodiment to simplify the operator's selection tasks.

Specifically, instead of providing a device to input the values A, B, and C, the CPU 15B has a program whereby, when the operator uses the switch 18 to select the equation computation mode, the data which was obtained and stored in the previous sample test is recalled, the statistical quantities μX, μY, σ_x, σ_y, ρ, etc., are automatically computed, and the values A, B, and C are also automatically computed.

The program further computes the value D in Equation (7) with these computed results when the region coefficient d is input by the operator via the device 24. This determines all coefficients of discriminant Equation (7)' to specify this equation. In this way, the automatic setting for the region discriminant Equation (7)' is completed.

Discriminant Equation According to the Second Embodiment

Instead of the discriminant equation for the above embodiment, it is also possible to use the discriminant equation described below. The embodiment using this equation will be explained as a second embodiment with regard to the discriminant equation.

If the inspection objects have an approximately constant volume or a fixed size, such as for packaged products, and even if the objects have material effect, then the following Equations (4a) and (7a) can be used in place of the Equations (4) and (7).

$$\frac{(x-\mu X)^2}{\sigma_x^2} + \frac{(y-\mu y)^2}{\sigma_y^2} = 2d^2 = D' \quad (4a)$$

The major axis of the elliptical distribution of the characteristics of inspection objects having an approximately constant volume or a fixed size becomes shorter and the shape approaches that of a circle.

Equation (4a) is applicable when p=0 in the first embodiment already described.

Here, with the following definitions, $$A' = \frac{1}{\sigma_x^2}$$

$$C' = \frac{1}{\sigma_y^2}$$

Equation (4a) can be used to determine the following Equation (7a) as the discriminant equation.

$$A'(X-\mu X)^2 + C'(Y-\mu Y)^2 - D' \leq 0 \tag{7a}$$

This case is equivalent to not using the correlation coefficient ($\rho$). In addition, just as in the first embodiment, it is also possible to assign a direct numerical value for D' using an empirical value.

Discriminant Equation According to the Third Embodiment

Instead of the discriminant equations described for the first and second embodiments above, it is also possible to use the discriminant equation described below. The embodiment using this discriminant equation will be explained as a third embodiment with regard to the discriminant equation.

Just as for the second embodiment described above, if the inspection objects are of an approximately constant volume or fixed size, such as packaged products, when the measurement data (primary values) P1-P4, etc. of a typical inspection object are plotted on an x-y coordinate system, they are gathered together in the vicinity of a specific location on the coordinate system, as shown in FIG. 17.

These data can be considered to be distributed within a closed range of predetermined spreads of $\pm d.\sigma x$ ($= \pm D x$) and $\pm d.\sigma y$ ($= \pm D y$) in the positive and negative directions with respect to the average values $\mu X$ and $\mu Y$ along the x and y axes, respectively. This derives the following Equations (4b) and (4c).

$$\mu X - D_x \leq X \leq \mu X + D_x \tag{4b}$$

$$\mu Y - D_y \leq Y \leq \mu Y + D_y \tag{4c}$$

The above Equations (4b) and (4c) can be transformed to obtain the following Equations (7b) and (7c)

$$|X - \mu X| - D_x \leq 0 \tag{7b}$$

$$|Y - \mu Y| - D_y \leq 0 \tag{7b}$$

Equations (7b) and (7c) are the discriminant equations, and objects which satisfy both of these equations are non-defective products containing no foreign matter. On the other hand, objects which fail to satisfy either or both of these equations are judged to be effective products containing foreign matter. An illustration of the region determined by these equations appears as a region enclosed within a rectangle in FIG. 17. Non-defective and defective products fall respectively in and outside the region.

In FIG. 17, the distance between the central point Po of the region and the origin point O1 of the coordinate system represents the average size of the material effect of the product. Thus, for objects having no material effect, these points Po and O1 are the same.

Discriminant equations (7b) and (7c) are also programmed in the control device 15. The correlation coefficient $\rho$ is also not taken into consideration for this third embodiment. The values Dx and Dy may also be empirical values.

The judgment section of CPU 15B according to the second or third embodiment has means for automatically computing A', C' and D', or Dx and Dy with a number of data Xs and Ys, which have been obtained by a sample test, stored and recalled, similarly to the case of the first embodiment.

In all the three embodiments, when the operator completes the equation determination, it is possible, instead of proceeding directly to actual operation, to store the coefficients and statistical quantities for the discriminant equation peculiar to each type of object for recall at a later time. Specifically, the operator stores the values A, B, C, D, or A', C', D', or Dx, Dy, and $\mu X$ and $\mu Y$ for the particular equation by inputting the code number for the type of object via the keyboard 25 and then pressing memory key Mi. The data is recalled by inputting the same code number and then pressing the key Mo.

Thus, in actual operation, by specifying a code number for various data pertaining to a particular type of object and storing it, part of the preliminary procedures can be eliminated during subsequent inspection work.

Operation Procedures

The composition and basic operation of this detector are as described above and the following is an explanation of the procedures involved in the detection of foreign matter. The various preparatory procedures described below are carried out prior to actual operation.

The operator sets the selector switch 18 to the sample test mode. At this time, the R/$\phi$ indicator 20 is set automatically to the mode indicating the absolute value r and phase angle $\theta$ of a vector r from the origin point O1 (not illustrated) on the x-y coordinate system (FIGS. 14 and 15). The r and $\theta$ values are calculated as follows and indicated on the R/$\phi$ indicator 20:

$$r = \sqrt{X_w^2 + Y_w^2}$$

$$\theta = \frac{180}{\pi} \cdot \tan^{-1} \frac{Y_w}{X_w}$$

First, a no-load test is performed to monitor the noise level of the apparatus without products passing through the coils by observing the values on the R/$\phi$ indicator 20. Next, for a product test operation, the operator selects a number of samples which have previously been determined to be free of foreign matter, passes them through the coils, reads the values on the indicator 20, and determines whether or not the values have increased from the values during no-load operation.

If data appears for which it is determined that the values indicated during the product test are clearly larger than the noise level during no-load operation, then it is judged that there are product characteristics, and the subsequent sample test is carried out in the "M" mode. If not, the subsequent sample test is carried out in the "N" mode.

As a result of the test operation, the operator sets the sample mode selector switch 23 to either the "M" or "N" mode. The operator presses the execution button 21, selects an appropriate large number of objects to be inspected which have previously been determined to be free of foreign matter for use as samples, and then performs the procedure for the sample test. As a result, regardless of which mode was used, the data for this large number of samples is stored in the internal memory.

When the operator sets the selector switch 18 to the mode of computation of the discriminant equation and presses the execution button 21, using the large amount of data obtained in the sample test, the values $\mu X$, Y, $\sigma_x$, $\sigma_y$, $\rho$, etc., related to that data are computed as described earlier. Furthermore, the various equations for the A, B, and C values are calculated and the coefficients for the left side of Equation (7) are determined.

When the operator selects the appropriate region coefficient d and inputs it into the region coefficient setting device 24, the right side value D of Equation (7) which determines the boundary of the region is calculated and discriminant Equation (7)' is determined. This completes the computation of the discriminant equation.

For the second and third embodiments, the equations (7a) or (7b) and (7c) are determined. The values of D, D', $D_x$, $D_y$, etc. can be found by calculating as previously discussed or if empirical values are known by direct input.

As explained earlier, because Equation (7) defines an elliptical or circular region, depending on the value of the correlation coefficient $\rho$, it is applicable to both products which have material effect and those which do not.

Equation (7)' is included in the CPU 15B in the form of a program, and computed for each pair of primary values Xp and Yp at final inspection of objects.

Theoretically, the region discriminant equation (7)', for example, can be determined by the operator selecting and inputting appropriate values A, B, C, and D or the region coefficient d in accordance with the characteristics of the object. However, because it is not easy to select these values, provision has been made in this embodiment to simplify the operator's selection tasks.

Specifically, instead of providing a device to input the values A, B, C, and D the CPU 15B has a program whereby, when the operator uses the switch 18 to select the equation computation mode, the data which was obtained and stored in the previous sample test is recalled. The statistical quantities $\mu X$, $\mu Y$, $\sigma x$, $\sigma y$, $\rho$, etc. are automatically computed, and the values A, B, C and D are also automatically computed when a region coefficient d is input by the operator.

Actual operation begins once the preparatory procedures have been completed. During actual operation, when the selector switch 18 is set to the operation mode, the program control circuit 17 directs the CPU 15B to run the program for inspection of objects. At the same time the R/$\phi$ indicator 20 is automatically set to the mode indicating the absolute value R and phase angle $\phi$ of the deviation vector R (not shown) from the average point $P_o$ on the x-y coordinate system (FIGS. 14 and 15).

The operator presses the execution button 21 for objects to begin passing through the coils. This causes a succession of weighted signals $X_w$ and $Y_w$ to be input to the CPU 15B, wherein pairs of primary values $X_p$ and $Y_p$ are obtained by the program of FIG. 8. Even while this processing is being performed, the detection operation of the objects continues.

Figure 18:
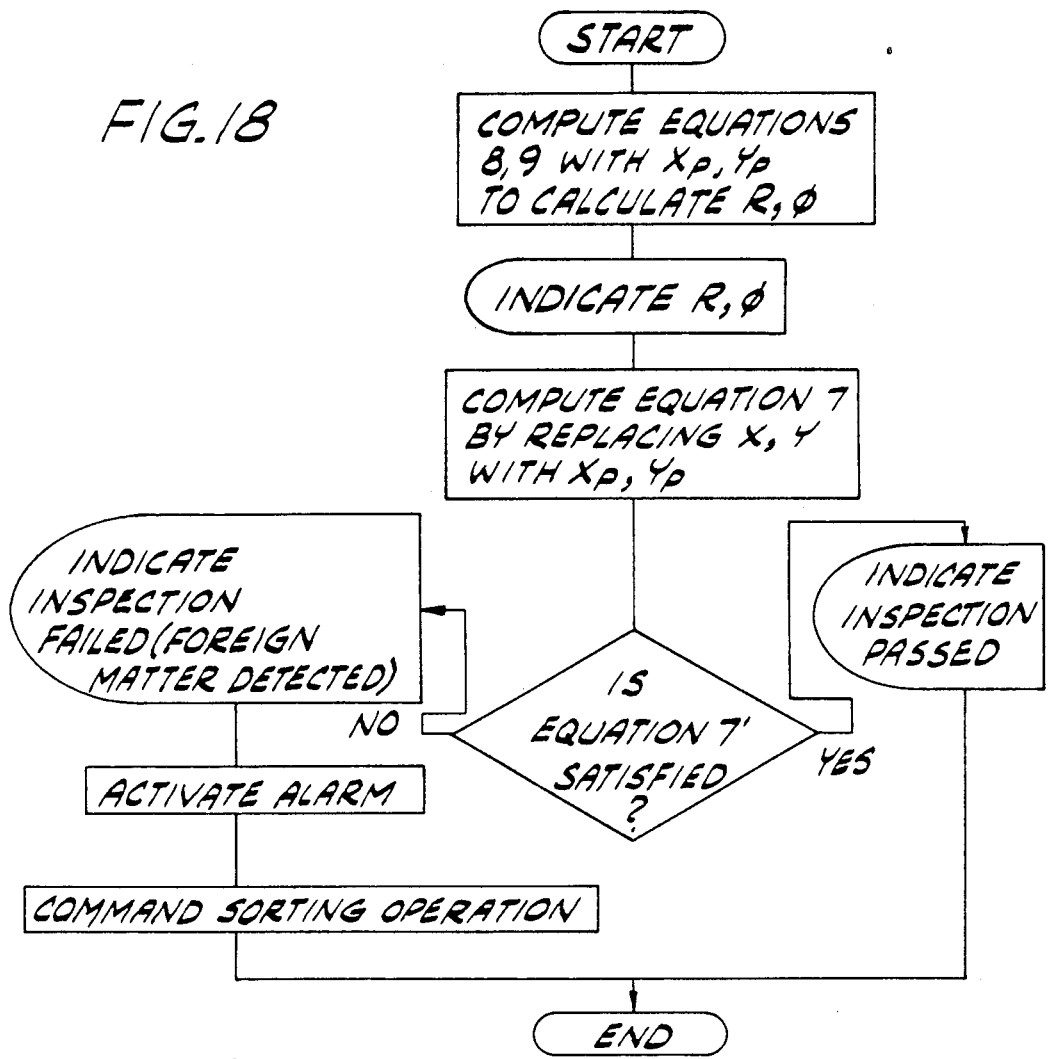
FIG. 18 is a flowchart of a program for determining and indicating whether primary values are outside a region predetermined with sample test data.

As shown in the flowchart in FIG. 18, the following Equations (8) and (9) are then computed using the primary value $X_m$ and $Y_m$ and the resultant values R and $\phi$ are indicated by the indicator 20.

$$R = \sqrt{(Xp - \mu X)^2 + (Yp - \mu Y)^2} \tag{8}$$

$$\phi = \frac{180}{\mu} \cdot \tan^{-1} \frac{(Yp - \mu y)^2}{(Xp - \mu X)^2} \tag{9}$$

The values $\mu X$ and $\mu Y$ are the average sample values obtained in the sample test in the M or N mode, and the values, A-D, or A', C', and D', or Dx and Dy in the discriminant equations (7)', (7a), or (7b) and (7c) have been determined in the preparatory procedures. When the primary values $X_p$ and $Y_p$ for a particular object are substituted for X and Y in Equation (7)', if they satisfy the equation, the data is judged to be within the reliable region determined with the samples.

If the equation is not satisfied, the alarm 19 is activated to warn that the object has not passed the inspection and a sorting device (not shown) at the end of the line is commanded to remove the object.

When an object contains material such as water or salt which has a material effect that varies from the previously sampled material effect, the computation of the discriminant equation may not be satisfied. This will cause a signal indicating that the object is faulty to be generated. Thus, this method is also effective for use in quality control.

The R/$\phi$ indicator 20 may be adapted to indicate the type of material effect of the object or the type of foreign matter (metal, iron, or non-ferrous metal etc.) which has been detected in the object, as shown in FIG. 13.

Because the sample test data is automatically computed to determine the judgment conditions, the determination of the judgment conditions is almost completely automatic. The operator only has to consider such things as whether to select a confidence level of $2\sigma$ or $3\sigma$ in order to determine the region coefficient. There is no need for adjustments which require skilled expertise, such as the phase adjustments of the excitation signal or of the reference signal for signal detection as are required in prior art detectors. Also, it is possible to achieve a remarkable improvement over the prior art detectors in the precision of the detection of foreign matter which is contained in inspected objects having a material effect.

As described above, because it is possible to clearly identify each detection signal even when the detector continuously generates detection signals, for example, when it is used as a detector for powders or other objects which flow continuously, it is possible to accurately find the number of particles of foreign matter which are present. Additionally, if the transport speed and detection speed are known, it is also possible to accurately find the location of the foreign matter.

For this reason, damage to processing equipment which might result from the presence of foreign matter in raw materials, or the like, is prevented. Furthermore, the shipment of products containing foreign matter is also prevented.

It is also possible to detect instances where the quality of the product differs from a specified level. Furthermore, because the detection signals contain not only data on whether or not foreign matter is present, but also quantitative data as well, the detection of foreign matter or of quality differences is easily accomplished.

Furthermore, because the composition is simple, the detector can be provided at a lower cost than previous detectors, and maintenance and adjustments can be easily performed.

As various changes could be made in the above constructions without departing from the scope of the invention, it is intended that all matter contained in the above description or shown in the accompanying drawings shall be interpreted as illustrative and not in a limiting sense.

What is claimed is:

1. A detector for detecting foreign matter in an object comprising:

means for providing first and second detected signals representative of an electromagnetic parameter of the object;

means connected to said providing means for converting said detected signals into first and second series of digital values, respectively;

means connected to said converting means for determining a representative value for the object from each said series of digital values; and means for comparing the representative values to reference values for the object;

said comparing means comprising means for obtaining a deviation vector calculated from the difference between the vector of said representative values and the vector of said reference values, means for discriminating whether said deviation vector of said reference values reaches outside of a region which is mathematically defined by a discriminant equation and which includes said reference values; and means for indicating the presence of foreign matter in the object when the deviation vector is outside the region.

2. A detector for detecting foreign matter in an object comprising:

means for providing a pair of analog signals representative of electromagnetic parameters of the object or samples of the object;

means connected to said providing means for converting said analog signals into first and second series of digital values, respectively;

means connected to said converting means for storing a number of first and second sample data which are selected respectively from the first and second series of digital values of the samples;

means for determining a pair of representative values respectively from the first and second series of digital values for the object;

means connected to said determining means for computing a discriminant equation such as $$A(X-\mu X)^2 + B(X-\mu X)(Y-\mu Y) + C(Y-\mu Y)^2 - D \leq 0$$

or $$A'(X-\mu X)^2 + C'(Y-\mu Y)^2 - D' \leq 0$$

or $$|X-\mu X| - Dx \leq 0 \text{ and}$$

$$|Y-\mu Y| - Dy \leq 0$$

wherein the constants are defined as $$A = \frac{1}{(1-\rho^2)\sigma x^2}$$

$$B = \frac{-2\rho}{(1-\rho^2)\sigma x \sigma y}$$

$$C = \frac{1}{(1-\rho^2)\sigma y^2}$$

$$D = \frac{2d^2}{1+\rho}$$

or $$A' = \frac{1}{\sigma x^2}$$

$$C' = \frac{1}{\sigma y^2}$$

$$D' = 2d^2$$

or $$Dx = d \cdot \sigma x$$

$$Dy = d \cdot \sigma y;$$

wherein $\mu X$ and $\mu Y$ are average digital values for the samples, $\sigma x$ and $\sigma y$ are standard deviation values for the samples, $\rho$ is a correlation coefficient for the samples and d is a constant appropriately selected for said samples;

means for obtaining the values of said constants $\mu X$ and $\mu Y$, A, B, C and D or A', C' and D' or Dx and Dy from said sample data recalled from said storing means;

means for computing said discriminant equation with said obtained values of the constants and said pair of representative values; and means for indicating the presence of foreign matter in the object when at least one of the representative values is beyond a region defined by the computed discriminant equation.

3. The detector of claim 2 wherein said analog signals have two dimensions.

4. The detector of claim 3 wherein said dimensions comprise phase and amplitude.

5. A detector for detecting foreign matter in an object comprising:

means for providing first and second detected signals representative of an electromagnetic parameter of the object;

means connected to said providing means for converting said detected signals into first and second series of digital values, respectively;

means for defining a set of reference values for the object whenever each of the samples is tested;

means for storing said reference values;

means connected to said converting means for determining a representative value for the object from each said series of digital values;

means for comparing each said representative value to the set of stored reference values wherein said storing means comprising means for storing a number of first and second sample data selected respectively from the first and second series of digital values of samples of the object; said storing means further comprising means for storing a set of first and second data whenever each of said samples is tested; and means for indicating the presence of foreign matter in the object when at least one of the representative values is beyond the set of reference values.

6. The detector of claim 5 wherein said storing means comprises means for providing a set of reference values for each kind of the object respectively from stored numbers of first and second sample data of said object.

7. A detector for detecting foreign matter in an object comprising:

means for providing first and second detected signals representative of an electromagnetic parameter of the object;

means for converting said detected signals into first and second series of digital values, respectively;

means for determining a first representative value for the object from said first series of digital values and for determining a second representative value for the object from said second series of digital values;

means for calculating a discriminant equation based on said representative values, said equation mathematically defining a region including said reference values;

means for comparing said representative values to the region; and means for indicating the presence of foreign matter in the object when at least one of the representative values is beyond the region.

8. A detector for detecting foreign matter in an object comprising:

means for providing first and second detected signals representative of an electromagnetic parameter of the object, said providing means comprising means for generating an oscillating signal, means connected to said generating means and including a primary coil for generating an electromagnetic field and two secondary coils for producing a differential signal when the object passes through said electromagnetic field, and means for detecting the differential signal;

means connected to said providing means for converting said detected signals into first and second series of digital values, respectively;

means for defining a set of reference values; and means connected to said converting means for determining a representative value for the object from each said series of digital values; said determining means comprising means for generating a passage signal when the object passes within a predetermined distance of one of the secondary coils and means for selecting the representative value while the passage signal is being generated;

means for comparing each said representative value to the set of reference values; and means for indicating the presence of foreign matter in the object when at least one of the representative values is beyond the set of reference values.

9. The detector of claim 7, wherein said determining means comprises means for weighting said first and second series of digital values, respectively, said weighting means including non-recursive digital weighting means.

10. The detector of claim 9, wherein said weighting means further includes recursive digital weighting means.

11. The detector of claim 8, wherein said comparing means comprises means for calculating with said representative values a discriminant equation which mathematically defines a region including said reference values.

12. The detector of claim 7, wherein said equation involves a coefficient regarding a standard deviation of the detected signal of the object.

13. The detector of claim 7, 11, 9, or 10 wherein said equation is as follows:

$$A(X-\mu X)^2 + B(X-\mu X)(Y-\mu Y) + C(Y-\mu Y)^2 - D \leq 0$$

and wherein A, B, C, D, $\mu X$ and $\mu Y$ are constants, X is the representative value of the first detected signal and Y is the representative value of the second detected signal.

14. The detector of claim 7 wherein said equation contains constants, and further comprising means for storing and recalling the constants with code numbers associated therewith for repeated use.

15. The detector of claim 13 wherein said constants are defined as $$A = \frac{1}{(1-\rho^2)\sigma x^2}, B = \frac{-2\rho}{(1-\rho^2)\sigma x \sigma y},$$

$$C = \frac{1}{(1-\rho^2)\sigma y^2}, D = \frac{2d^2}{1+\rho},$$

and $\mu X$ and $\mu Y$ are average digital values for the object, $\sigma x$ and $\sigma y$ are standard deviation values for the object, $\rho$ is a correlation coefficient for the object, and d is a coefficient which is appropriately selected for the object.

16. The detector of claim 7, 11, 9 and 10 wherein said equation is as follows:

$$A'(X-\mu X)^2 + C'(Y-\mu Y)^2 - D' \leq 0$$

and wherein A', C', D', $\mu X$, and $\mu Y$ are constants, X is the representative value of the first detected signal and Y is the representative value of the second detected signal.

17. The detector of claim 16 wherein said constants are defined as $$A' = \frac{1}{\sigma x^2}, C' = \frac{1}{\sigma y^2}, D' = 2d^2,$$

and $\mu X$ and $\mu Y$ are average digital values for the object, $\sigma X$ and $\sigma Y$ are standard deviation values for the object and d is a coefficient which is appropriately selected for the object.

18. The detector of claim 7, 11, 9 or 10 wherein said equation comprises $|X-\mu X| - Dx \leq 0$ and $|Y-\mu Y| - Dy \leq 0$ and wherein $\mu X$, $\mu Y$, Dx and Dy are constants, X is the representative value of the first detected signal and Y is the representative value of the second detected signal.

19. The detector of claim 18 wherein said constants are defined as $Dx = d \cdot \sigma X$, $Dy = d \cdot \sigma y$ wherein $\mu X$ and $\mu Y$ are average digital values for the object, $\sigma X$ and $\sigma Y$ are standard deviation values for the object and d is a coefficient which is appropriately selected for the object.

20. The detector of claim 9 wherein said weighting means comprises means for successively multiplying each of the digital values by a series of coefficients and means for summing each of the digital values multiplies by the series of coefficients after each successive multiplication to provide a series of weighted digital values.

21. The detector of claim 7, wherein said equation contains constants, and further comprising means for computing the constants based on plural sample test data for the object.

22. The detector of claim 7 wherein said equation contains constants, and further comprising:

means for storing a number of first and second sample data selected respectively from the first and second series of digital values of samples of the object; and means for determining said constants with the sample data recalled from said storing means.

23. The detector of claim 7, and further comprising indicating means including means for calculating the absolute value and phase angle of a deviation vector from the differences between said first representative and reference values and between said second representative and reference values, respectively.

24. The detector of claim 7, wherein said equation is a statistical equation.

25. A detector for detecting foreign matter in an object comprising:

an oscillator for generating an oscillating signal;

a phase shifter connected to said oscillator and adapted to provide a phase shifted oscillating signal;

an electromagnetic transducer including an excitation coil connected to said oscillator and two interconnected detection coils magnetically coupled to the excitation coil and adapted to produce a differential signal therebetween when the object is passed through said transducer;

a first detector adapted to produce a first detected analog signal corresponding to the component of the differential signal in phase with said oscillating signal;

a second detector adapted to produce a second detected analog signal corresponding to the component of the differential signal in phase with said phase shifted oscillating signal;

means connected to said first and second detectors adapted for converting the first and second detected signals into first and second series of digital values, respectively;

means connected to said conversion means for determining a representative value for the object from each of the first and second series of the digital values;

means connected to said determining means for comparing the representative values to reference values wherein said comparing means comprises means for calculating with the representative values a discriminant equation which mathematically defines a region including said reference values; and means for indicating the presence of foreign matter in the object when at least one of the representative values is beyond the region.

26. The detector of claim 25 wherein the determining means comprises means for generating a passage signal when the object passes within a predetermined distance of one of the secondary coils and means for selecting the representative value while the passage signal is being generated.

27. The detector of claim 25, wherein said comparing means comprises means for computing a preset range according to the following equation: $A(X-\mu X)^2 + B(X-\mu X)(Y-\mu Y) + C(Y-\mu Y)^2 - D \leq 0$ and wherein A, B, C, D, $\mu X$ and $\mu Y$ are constants, X is the representative value of the first detected signal and Y is the representative value of the second detected signal.

28. The detector of claim 27 wherein said constants are defined as $$A = \frac{1}{(1-\rho^2)\sigma x^2}, B = \frac{-2\rho}{(1-\rho^2)\sigma x \sigma y}.$$

$$C = \frac{1}{(1-\rho^2)\sigma y^2}, D = \frac{2d^2}{1+\rho},$$

and $\mu X$ and $\mu Y$ are average digital values for the object, $\sigma x$ and $\sigma y$ are standard deviation values for the object, $\rho$ is a correlation coefficient for the object, and d is a constant which is appropriately selected for the object.

29. The detector of claim 25, wherein said comparing means comprises means for computing a preset range according to the following equation: $A'(X-\mu X)^2 + C'(Y-\mu Y)^2 - D' \leq 0$ and wherein A', C', D', $\mu X$, and $\mu Y$ are constants, X is the representative value of the first detected signal and Y is the representative value of the second detected signal.

30. The detector of claim 29 wherein said constants are defined as $$A' = \frac{1}{\sigma x^2}, C' = \frac{1}{\sigma y^2}, D' = 2d^2,$$

and $\mu X$ and $\mu Y$ are average digital values for the object, $\sigma X$ and $\sigma Y$ are standard deviation values for the object and d is a constant which is appropriately selected for the object.

31. The detector of claim 25, wherein said comparing means comprises means for computing a preset range according to the following equations: $|X-\mu X| - Dx \leq 0$ and $|Y-\mu Y| - Dy \leq 0$ and wherein $\mu X$, $\mu Y$, Dx and Dy are constants, X is the representative value of the first detected signal and Y is the representative value of the second detected signal.

32. The detector of claim 31 wherein said constants are defined as $Dx = d \cdot \sigma x$, $Dy = d \cdot \sigma y$ and $\mu X$ and $\mu Y$ are average digital values for the object, $\sigma x$ and $\sigma Y$ are standard deviation values for the object and d is a constant which is appropriately selected for the object.

33. The detector of claim 25 wherein said equation is as follows:

$$A(X-\mu X)^2 + B(X-\mu X)(Y-\mu Y) + C(Y-\mu Y)^2 - D \leq 0$$

and wherein A, B, C, D, $\mu X$ and $\mu Y$ are constants, X is the representative value of the first detected signal and Y is the representative value of the second detected signal.

34. The detector of claim 25 wherein said equation is as follows:

$$A'(X-\mu X)^2 + C'(Y-\mu Y)^2 - D' \leq 0$$

and wherein A', C', D', $\mu X$, and $\mu Y$ are constants, X is the representative value of the first detected signal and Y is the representative value of the second detected signal.

35. The detector of claim 25 wherein said equation comprises $|X-\mu X| - Dx \leq 0$ and $|Y-\mu Y| - Dy \leq 0$ and wherein $\mu X$, $\mu Y$, Dx and Dy are constants, X is the representative value of the first detected signal and Y is the representative value of the second detected signal.

* * * * *